United States Patent
Pan et al.

(10) Patent No.: US 11,818,145 B2
(45) Date of Patent: Nov. 14, 2023

(54) CHARACTERIZING USER BEHAVIOR IN A COMPUTER SYSTEM BY AUTOMATED LEARNING OF INTENTION EMBEDDED IN A SYSTEM-GENERATED EVENT GRAPH

(71) Applicant: International Business Machines Corporation, Armonk, NY (US)

(72) Inventors: Xiaorui Pan, San Jose, CA (US); Xiaokui Shu, Ossining, NY (US); Dhilung Hang Kirat, White Plains, NY (US); Jiyong Jang, White Plains, NY (US); Marc Philippe Stoecklin, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 730 days.

(21) Appl. No.: 16/706,926

(22) Filed: Dec. 9, 2019

(65) Prior Publication Data

US 2021/0176260 A1 Jun. 10, 2021

(51) Int. Cl.
*H04L 9/40* (2022.01)
*G06N 3/04* (2023.01)
*G06N 3/08* (2023.01)

(52) U.S. Cl.
CPC .......... *H04L 63/1416* (2013.01); *G06N 3/04* (2013.01); *G06N 3/08* (2013.01)

(58) Field of Classification Search
USPC .................................................... 726/22–25
See application file for complete search history.

(56) References Cited

U.S. PATENT DOCUMENTS

| | | | | |
|---|---|---|---|---|
| 7,624,448 B2 * | 11/2009 | Coffman | ............. | H04L 63/1416 726/22 |
| 7,657,855 B1 * | 2/2010 | Manaker, Jr. | ....... | G06F 30/3312 716/113 |

(Continued)

OTHER PUBLICATIONS

Zong et al.; Behavior Query Discovery in System Generated Temporal Graphs; downloaded from google (Year: 2015).*

(Continued)

*Primary Examiner* — Kambiz Zand
*Assistant Examiner* — Mahabub S Ahmed
(74) *Attorney, Agent, or Firm* — Anthony M. Pallone; Jeffrey S. LaBaw; David H. Judson

(57) ABSTRACT

An automated technique for security monitoring leverages a labeled semi-directed temporal graph derived from system-generated events. The temporal graph is mined to derive process-centric subgraphs, with each subgraph consisting of events related to a process. The subgraphs are then processed to identify atomic operations shared by the processes, wherein an atomic operation comprises a sequence of system-generated events that provide an objective context of interest. The temporal graph is then reconstructed by substituting the identified atomic operations derived from the subgraphs for the edges in the original temporal graph, thereby generating a reconstructed temporal graph. Using graph embedding, the reconstructed graph is converted into a representation suitable for further machine learning, e.g., using a deep neural network. The network is then trained to learn the intention underlying the temporal graph. The approach operates to understand running behavior of programs, to classify them, and then enable detection of potential malicious behaviors.

21 Claims, 8 Drawing Sheets

(56) References Cited

U.S. PATENT DOCUMENTS

| | | | |
|---|---|---|---|
| 9,367,809 B2* | 6/2016 | Puri | G06F 16/2455 |
| 9,516,053 B1* | 12/2016 | Muddu | G06F 3/0484 |
| 9,628,501 B2 | 4/2017 | Datta Ray et al. | |
| 9,628,506 B1* | 4/2017 | Han | H04L 63/1483 |
| 9,652,504 B2* | 5/2017 | Aggarwal | G06F 16/24568 |
| 9,928,526 B2 | 3/2018 | Dereszynski et al. | |
| 10,685,293 B1* | 6/2020 | Heimann | H04L 63/1425 |
| 10,831,452 B1* | 11/2020 | Hunter | G06N 3/086 |
| 10,915,631 B2* | 2/2021 | Chen | G06F 21/566 |
| 11,017,661 B1* | 5/2021 | Beauchamp | H04W 4/44 |
| 11,195,107 B1* | 12/2021 | Jiang | G06N 3/063 |
| 11,201,890 B1* | 12/2021 | Coull | G06F 21/554 |
| 11,218,498 B2* | 1/2022 | Hajimirsadeghi | G06N 3/02 |
| 2002/0194393 A1* | 12/2002 | Hrischuk | G06F 9/542 719/318 |
| 2003/0142851 A1* | 7/2003 | Brueckner | H04L 67/52 382/107 |
| 2009/0037772 A1* | 2/2009 | Wegerich | G05B 23/0254 714/E11.002 |
| 2009/0049545 A1* | 2/2009 | Nagpal | G06F 9/526 726/22 |
| 2011/0252032 A1* | 10/2011 | Fitzgerald | H04L 63/20 709/224 |
| 2015/0074806 A1* | 3/2015 | Roundy | H04L 63/1425 726/23 |
| 2015/0261955 A1* | 9/2015 | Huang | G06F 21/567 726/23 |
| 2015/0339570 A1* | 11/2015 | Scheffler | G06N 3/04 706/27 |
| 2016/0048681 A1* | 2/2016 | Fang | G06F 21/552 726/23 |
| 2016/0164901 A1* | 6/2016 | Mainieri | H04L 63/1441 726/23 |
| 2016/0219066 A1* | 7/2016 | Vasseur | H04L 63/1458 |
| 2017/0063888 A1* | 3/2017 | Muddu | H04L 63/1433 |
| 2017/0063906 A1* | 3/2017 | Muddu | G06N 20/20 |
| 2017/0063912 A1* | 3/2017 | Muddu | G06V 10/225 |
| 2017/0279694 A1* | 9/2017 | Sartran | H04L 41/14 |
| 2017/0286190 A1* | 10/2017 | Ishakian | G06F 16/9024 |
| 2017/0293836 A1* | 10/2017 | Li | G06N 3/044 |
| 2017/0346839 A1* | 11/2017 | Peppe | H04L 63/1433 |
| 2018/0032724 A1* | 2/2018 | Tang | H04L 63/1416 |
| 2018/0048661 A1* | 2/2018 | Bird | G06F 21/57 |
| 2018/0048662 A1* | 2/2018 | Jang | H04L 63/1416 |
| 2018/0152466 A1* | 5/2018 | Sartran | H04L 63/1416 |
| 2018/0159876 A1* | 6/2018 | Park | H04L 63/1425 |
| 2018/0219888 A1* | 8/2018 | Apostolopoulos | H04L 63/1425 |
| 2018/0316704 A1* | 11/2018 | Joseph Durairaj | H04L 41/142 |
| 2018/0329958 A1* | 11/2018 | Choudhury | G06F 16/2456 |
| 2019/0205533 A1* | 7/2019 | Diehl | G06F 21/567 |
| 2019/0207969 A1* | 7/2019 | Brown | G06F 21/552 |
| 2019/0236464 A1* | 8/2019 | Feinson | G06N 5/04 |
| 2019/0312898 A1* | 10/2019 | Verma | G06N 5/022 |
| 2019/0340684 A1* | 11/2019 | Belanger | G06N 3/044 |
| 2019/0354689 A1* | 11/2019 | Li | G06F 21/563 |
| 2019/0378051 A1* | 12/2019 | Widmann | G06N 20/00 |
| 2020/0076842 A1* | 3/2020 | Zhou | G06N 5/02 |
| 2020/0143052 A1* | 5/2020 | Mazumder | G06F 21/566 |
| 2020/0167786 A1* | 5/2020 | Kursun | H04L 63/08 |
| 2020/0169483 A1* | 5/2020 | Kursun | G06Q 20/3678 |
| 2020/0213338 A1* | 7/2020 | Lotem | G06N 20/00 |
| 2020/0228558 A1* | 7/2020 | Apostolopoulos | G06F 16/9024 |
| 2020/0257602 A1* | 8/2020 | Crosby | G06F 18/24 |
| 2020/0293960 A1* | 9/2020 | Weaver | G06Q 10/0635 |
| 2020/0394499 A1* | 12/2020 | Yao | G06N 5/022 |
| 2021/0019325 A1* | 1/2021 | Edge | G06F 16/254 |
| 2021/0067527 A1* | 3/2021 | Chen | G06N 3/08 |
| 2021/0084058 A1* | 3/2021 | Soliman | G06N 20/00 |
| 2022/0255953 A1* | 8/2022 | Hercock | H04L 63/1416 |

OTHER PUBLICATIONS

Zhu et al.; Gemini: A Computation-Centric Distributed Graph Processing System; This paper is included in the Proceedings of the 12th USENIX Symposium on Operating Systems Design and Implementation (OSDI '16). Nov. 2-4, 2016 • Savannah, GA, USA (Year: 2016).*

Ahmad, et al.; Graph-Based Pattern Identification from Architecture Change Logs; springer (Year: 2012).*

Abadi, et al.; TensorFlow: Large-Scale Machine Learning on Heterogeneous Distributed Systems; downloaded from scholar.googl.com (Year: 2016).*

Wüchner et al.; Malware Detection with Quantitative Data Flow Graphs; ACM (Year: 2014).*

Ediger et al.; Massive Streaming Data Analytics: A Case Study with Clustering Coefficients; IEEE (Year: 2010).*

Zong et al, "Behavior query discovery in system-generated temporal graphs," Proceedings of the VLDB Endowment, vol. 9, No. 4, 2015.

Martignoni, et al, "A layered architecture for detecting malicious behaviors," Recent Advances in Intrusion Detection, Springer Berlin/Heidelberg, 2008.

Saraydaryan, et al, "Comprehensive security framework for global threads analysis," IJCSI International Journal of Computer Science Issues, vol. 2, 2009.

Moriano, et al, "Insider threat event detection in user-system interactions," MIST'17, Oct. 30, 2017.

"Flow-graph analysis of system calls for exploit detection," IPCOM000254427D, Jun. 27, 2018.

"Method and apparatus for synthesizing behavioral malware specifications," IPCOM000187482D, Sep. 8, 2009.

"Static system-call graph generation," IPCOM000254428D, Jun. 27, 2018.

"System, method and apparatus for reducing false positives in the anomaly detection system by using static analysis of the application," IPCOM000212141D, Nov. 1, 2011.

\* cited by examiner

CHARACTERIZING USER BEHAVIOR IN A COMPUTER SYSTEM BY AUTOMATED LEARNING OF INTENTION EMBEDDED IN A SYSTEM-GENERATED EVENT GRAPH

STATEMENT REGARDING SPONSORED RESEARCH

This invention was made with government support under Contract FA8650-15-C-7561 awarded by the Defense Advanced Research Projects Agency (DARPA). The government has certain rights in the invention.

BACKGROUND

Technical Field

This disclosure relates generally to computer network and system security and, in particular, to techniques for characterizing and discriminating user behavior.

Background of the Related Art

Intrusion and anomaly detection products, systems and services are well-known. Indeed, methods for intrusion detection and anti-virus solutions were introduced decades ago. Most traditional host-based and network-based attack/intrusion detection products utilize a static signature matching approach. For example, traditional anti-virus, firewall, intrusion detection systems (IDS), and the like, rely on concrete binary or network communication signatures to identify attacks. The detection procedure typically includes: (i) attack discovery, (ii) signature selection, (iii) signature distribution, and (iv) endpoint signature matching.

Another class of detection mechanisms tries to port more and more intelligence into an endpoint. These mechanisms, however, typically focus on single-process detection. Intra-process behavior modeling and detection also is well-known, as evidenced by program anomaly detection literature, as well as most state-of-the-art commercial endpoint intrusion detection products. These mechanisms basically monitor system events, e.g., system calls and/or Windows APIs of each process, and then decide whether the process is malicious based on its behavior model. A solution of this type can be nullified when stealthy attacks are implemented across processes, or when the attacker leverages benign processes to achieve attack goals.

Although the above-described approaches provide advantages, they often cannot detect new or rapidly updated attacks in a timely manner or provide sufficient attack surface coverage with respect to attacks that leverage inter-process activities. Some behavior-based endpoint detection products attempt to address these deficiencies by attempting to model direct inter-process activities, such as process spawning, and malware downloading. While inter-process activity modeling of this type is useful, the known solutions operate on an ad hoc basis, with only a small amount of direct inter-process activity being modeled due to practicality constraints in existing products. Moreover, these approaches do not address indirect inter-process activities. Thus, even where some inter-process activity modeling is available, an attacker can circumvent the detection, e.g., by constructing stealthy attacks with multiple processes and files in a large time window.

Causality reasoning is an important task in cybersecurity threat intelligence and investigation. Given an indicator of compromise (IOC), a Security Operation Center (SOC) analyst needs to find out what if any earlier signs of the compromise exist, what led to the compromise (including the root cause), and what are the consequences of the compromise (extent and impact). Causality reasoning helps analysts to rule out false positives in IOCs, to discover large attack campaigns, and to assess their impact. Today, SOC analysts regularly perform such investigation manually, typically supported by spreadsheets and notes on paper. Such reasoning requires extensive manual work, e.g., pulling data from different sources, connecting that data in graphs, and determining the causal chain and consequences of IOCs. These known techniques rely heavily on the intuition and experience of the analysts to reproduce well-formatted causal chains, and not to miss important elements. More recently, graph-based automation has been applied in causality tracking. In these automated approaches, threat discovery is transformed into a graph computation problem. In particular, security logs, traces, and alerts are stored in a temporal graph (computation) derived from system-generated events. The graph records the history of monitored systems, including benign activities and malicious ones, as interconnected entities and events. Threat discovery then becomes a graph computation problem to identify a subgraph therein that describes a threat or an attack, preferably with the help of alerts and security domain knowledge stored as element labels.

Although the above-described techniques provide advantages, there remains a need to provide additional automation and techniques that can facilitate identifying an intention (benign or malicious) underlying related user behavior when a security alert is raised. The approach herein addresses this need.

BRIEF SUMMARY

An automated technique for security monitoring leverages a labeled semi-directed temporal graph derived from system-generated events. According to the technique, the temporal graph is mined to derive process-centric subgraphs, with each subgraph consisting of events related to a process. The subgraphs are then processed, e.g., using statistical learning, to identify atomic operations shared by the processes, wherein an atomic operation comprises a set of system-generated events that provide an objective context of interest. An atomic operation typically is a small set of common actions used by more than one process. The temporal graph is then reconstructed, preferably by substituting the identified atomic operations derived from the subgraphs for information (e.g., given edges or other entities) in the original temporal graph, thereby generating a reconstructed temporal graph. Using graph embedding, the reconstructed graph is then converted into a vector representation suitable for further machine learning, e.g., using a deep neural network (DNN). The deep neural network is then trained to learn the intention underlying the temporal graph. The approach operates to understand the running behavior of processes, and to classify them according to an objective summary of user behavior, thereby enabling more precise and scalable detection of potential malicious behaviors. Information generated by the technique may then be presented to security analysts or other automated systems so that the priority and security impact of the triggering incident can be more easily and quickly determined (and addressed).

The foregoing has outlined some of the more pertinent features of the subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the disclosed subject matter and the advantages thereof, reference is now made to the following descriptions taken in conjunction with the accompanying drawings, in which.

DETAILED DESCRIPTION OF AN ILLUSTRATIVE EMBODIMENT

As will be described below, the techniques herein utilize machine learning to derive semantic models of system events for use to provide behavior-based malware detection. Typically, machine learning algorithms and associated mechanisms execute as software, e.g., one or more computer programs, executing in one or more computing machines. As background, the following describes representative computing machines and systems that may be utilized for executing the learning process and using the derived system event model. Several execution environments (FIGS. 3-5) are also described.

Figure 1:
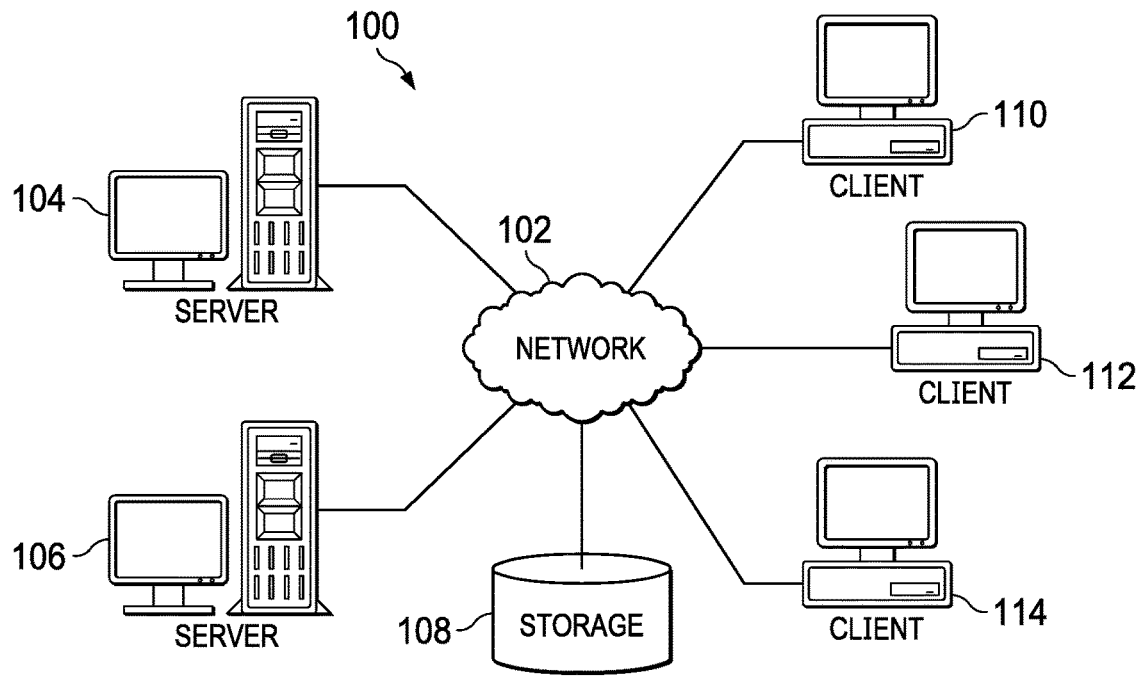
FIG. 1 depicts an exemplary block diagram of a distributed data processing environment in which exemplary aspects of the illustrative embodiments may be implemented.
Figure 2:
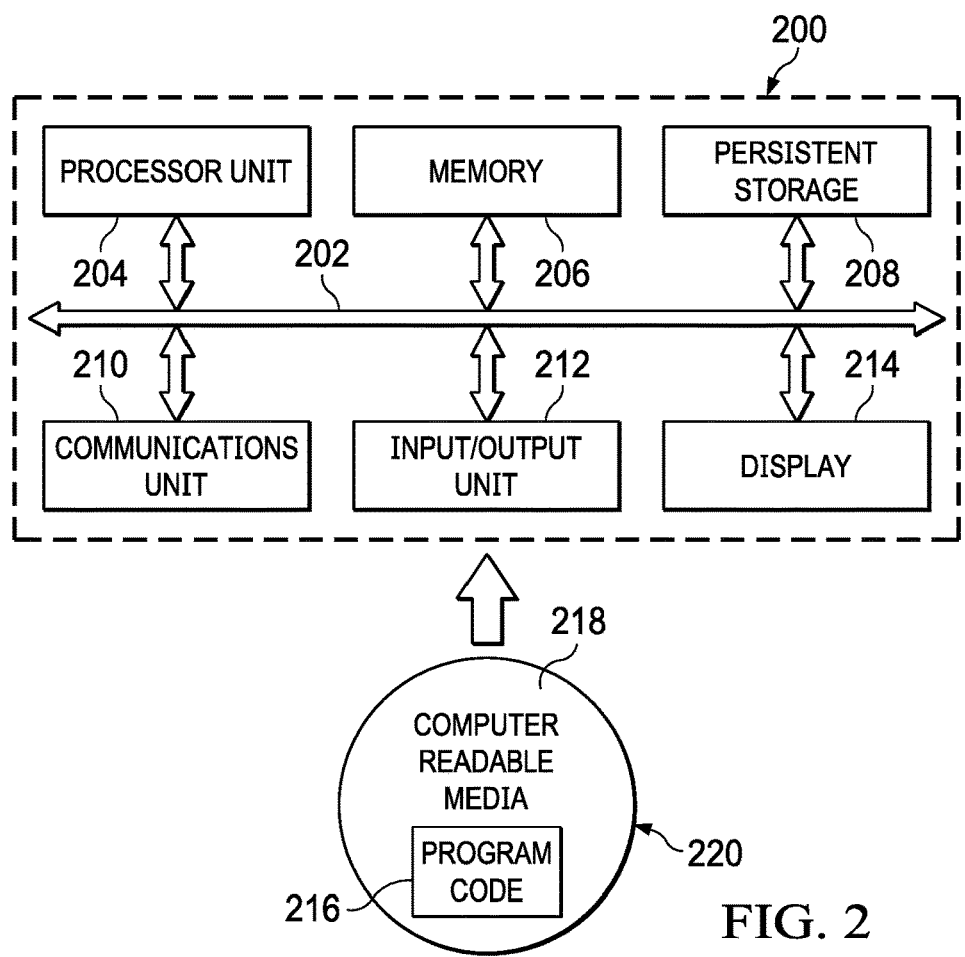
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

Computing machines such as described above may provide for machine learning. As is well-known, machine learning involves using analytic models and algorithms that iteratively learn from data, thus allowing computers to find insights in the data without being explicitly programmed where to look. Machine learning may be supervised or unsupervised. Supervised machine learning involves using training examples by which the machine can learn how to perform a given task. Unsupervised machine learning, in contrast, involves providing unlabeled data objects, which the machine then processes to determine an organization of the data. One well-known type of unsupervised machine learning is clustering, which refers to the notion of assigning a set of observations into subsets, which are referred to as "clusters," such that observations within a cluster have a degree of similarity. A common approach to clustering is k-means clustering, which is an algorithm that classifies or groups objects based on attributes or features into k number of group, typically by minimizing a sum of squares of distances between data and a centroid of a corresponding cluster. Unsupervised machine learning via clustering provides a way to classify the data. Other clustering algorithms are well-known.

Security Intelligence Platform with Incident Forensics

Figure 3:
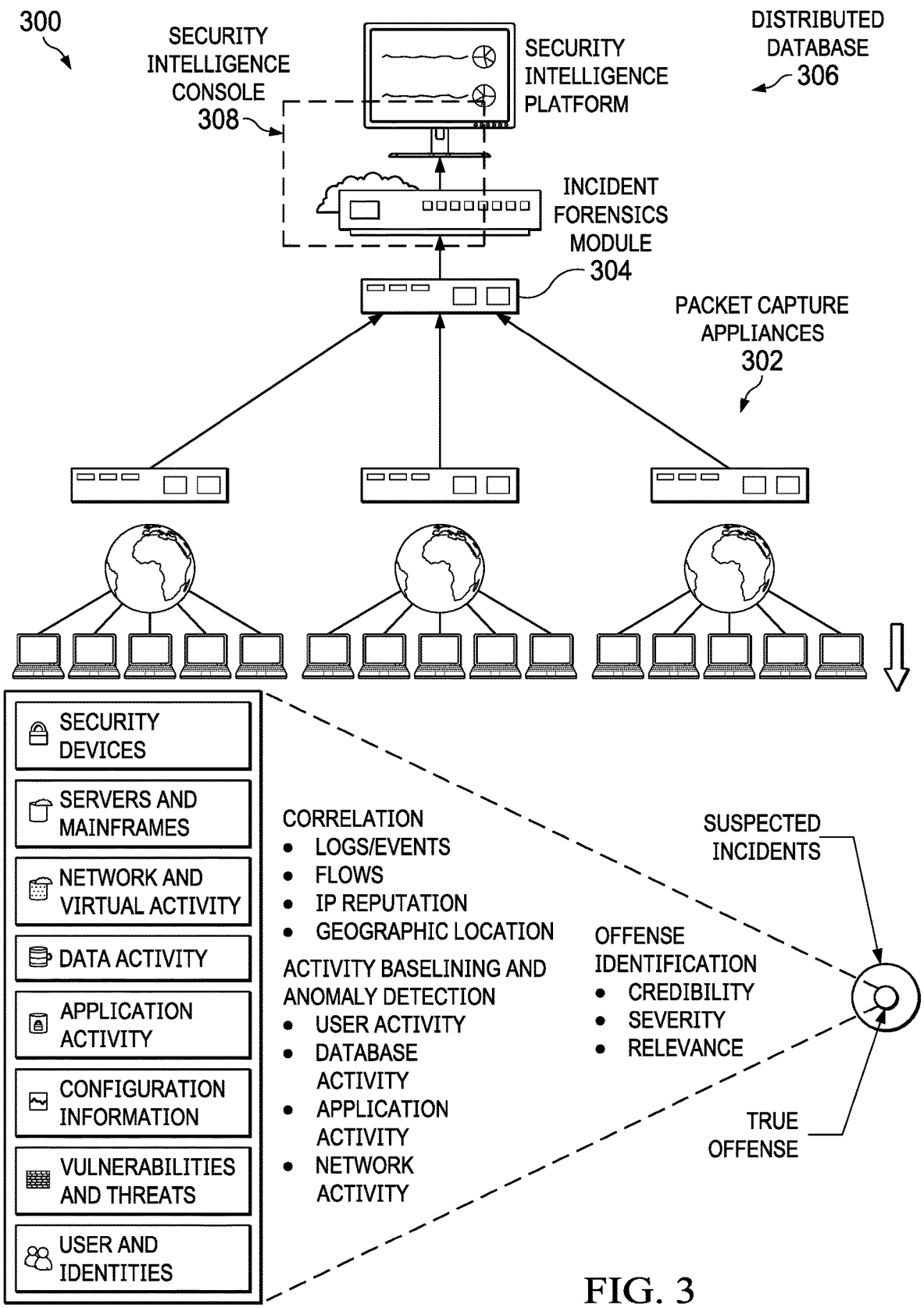
FIG. 3 illustrates a security intelligence platform in which the techniques of this disclosure may be practiced.

A representative security intelligence platform in which the techniques of this disclosure may be practiced is illustrated in FIG. 3.

Generally, the platform provides search-driven data exploration, session reconstruction, and forensics intelligence to assist security incident investigations. In pertinent part, the platform 300 comprises a set of packet capture appliances 302, an incident forensics module appliance 304, a distributed database 306, and a security intelligence console 308. The packet capture and module appliances are configured as network appliances, or they may be configured as virtual appliances. The packet capture appliances 302 are operative to capture packets off the network (using known packet capture (pcap) application programming interfaces (APIs) or other known techniques), and to provide such data (e.g., real-time log event and network flow) to the distributed database 306, where the data is stored and available for analysis by the forensics module 304 and the security intelligence console 308. A packet capture appliance operates in a session-oriented manner, capturing all packets in a flow, and indexing metadata and payloads to enable fast search-driven data exploration. The database 306 provides a forensics repository, which distributed and heterogeneous data sets comprising the information collected by the packet capture appliances. The console 308 provides a web- or cloud-accessible user interface (UI) that exposes a "Forensics" dashboard tab to facilitate an incident investigation workflow by an investigator. Using the dashboard, an investigator selects a security incident. The incident forensics module 304 retrieves all the packets (including metadata, payloads, etc.) for a selected security incident and reconstructs the session for analysis. A representative commercial product that implements an incident investigation workflow of this type is IBM® Security QRadar® Incident Forensics V7.2.3 (or higher). Using this platform, an investigator searches across the distributed and heterogeneous data sets stored in the database, and receives a unified search results list. The search results may be merged in a grid, and they can be visualized in a "digital impression" tool so that the user can explore relationships between identities.

Typically, an appliance for use in the above-described system is implemented is implemented as a network-connected, non-display device. For example, appliances built purposely for performing traditional middleware service oriented architecture (SOA) functions are prevalent across certain computer environments. SOA middleware appliances may simplify, help secure or accelerate XML and Web services deployments while extending an existing SOA infrastructure across an enterprise. The utilization of middleware-purposed hardware and a lightweight middleware stack can address the performance burden experienced by conventional software solutions. In addition, the appliance form-factor provides a secure, consumable packaging for implementing middleware SOA functions. One particular advantage that these types of devices provide is to offload processing from back-end systems. A network appliance of this type typically is a rack-mounted device. The device includes physical security that enables the appliance to serve as a secure vault for sensitive information. Typically, the appliance is manufactured, pre-loaded with software, and then deployed within or in association with an enterprise or other network operating environment; alternatively, the box may be positioned locally and then provisioned with standard or customized middleware virtual images that can be securely deployed and managed, e.g., within a private or an on premise cloud computing environment. The appliance may include hardware and firmware cryptographic support, possibly to encrypt data on hard disk.

Figure 4:
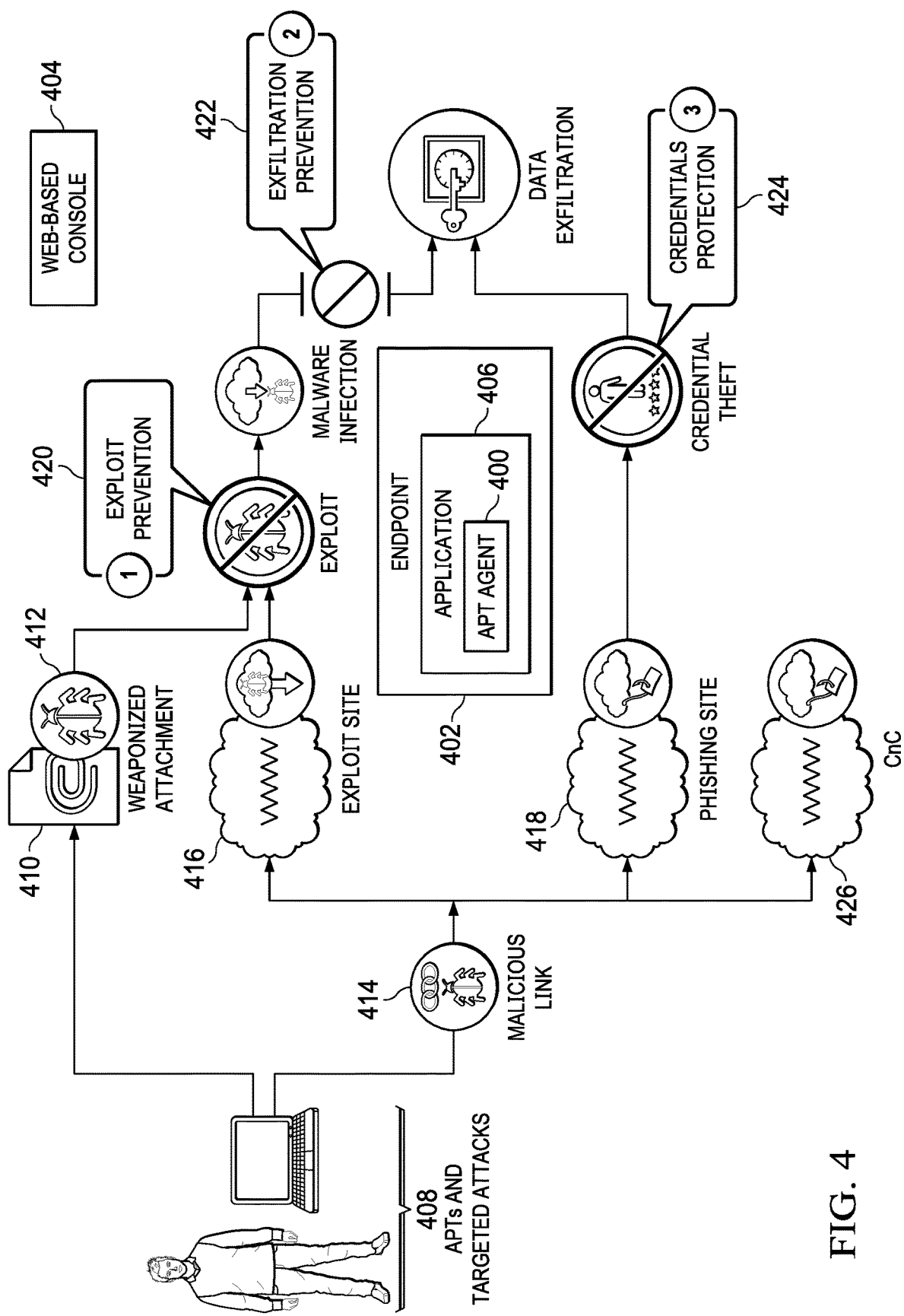
FIG. 4 depicts an Advanced Persistent Threat (APT) platform in which the techniques of this disclosure may be practiced.

An appliance of this type can facilitate Security Information Event Management (STEM). For example, and as noted above, IBM® Security QRadar® STEM is an enterprise solution that includes packet data capture appliances that may be configured as appliances of this type. Such a device is operative, for example, to capture real-time Layer 4 network flow data from which Layer 7 application payloads may then be analyzed, e.g., using deep packet inspection and other technologies. It provides situational awareness and compliance support using a combination of flow-based network knowledge, security event correlation, and asset-based vulnerability assessment. In a basic QRadar STEM installation, the system such as shown in FIG. 4 is configured to collect event and flow data, and generate reports. A user (e.g., an SOC analyst) can then investigate offenses to determine the root cause of a network issue.

Generalizing, Security Information and Event Management (SIEM) tools provide a range of services for analyzing, managing, monitoring, and reporting on IT security events and vulnerabilities. Such services typically include collection of events regarding monitored accesses and unexpected occurrences across the data network, and analyzing them in a correlative context to determine their contribution to profiled higher-order security events. They may also include analysis of firewall configurations, network topology and connection visualization tools for viewing current and potential network traffic patterns, correlation of asset vulnerabilities with network configuration and traffic to identify active attack paths and high-risk assets, and support of policy compliance monitoring of network traffic, topology and vulnerability exposures. Some SIEM tools have the ability to build up a topology of managed network devices such as routers, firewalls, and switches based on a transformational analysis of device configurations processed through a common network information model. The result is a locational organization which can be used for simulations of security threats, operational analyses of firewall filters, and other applications. The primary device criteria, however, are entirely network- and network-configuration based. While there are a number of ways to launch a discovery capability for managed assets/systems, and while containment in the user interface is semi-automatically managed (that is, an approach through the user interface that allows for semi-automated, human-input-based placements with the topology, and its display and formatting, being data-driven based upon the discovery of both initial configurations and changes/deletions in the underlying network), nothing is provided in terms of placement analytics that produce fully-automated placement analyses and suggestions.

Advanced Persistent Threat (APT) Prevention

APT mitigation and prevention technologies are well-known. For example, IBM® Trusteer Apex® is an automated solution that prevents exploits and malware from compromising enterprise endpoints and extracting information. A solution of this type typically provides several layers of security, namely, exploit prevention, data exfiltration prevention, and credentials protection.

FIG. 4 depicts a typical embodiment, wherein the APT solution is architected generally as agent code 400 executing in enterprise endpoint 402, together with a web-based console 404 that enables IT security to manage the deployment (of both managed and unmanaged endpoints) from a central control position. The agent code 400 operates by monitoring an application state at the time the application 406 executes sensitive operations, e.g., writing a file to the file system. Generally, the agent 400 uses a whitelist of legitimate application states to verify that the sensitive operation is executed (or not) under a known, legitimate state. An exploit will attempt to execute sensitive operations under an unknown (not whitelisted) state, thus it will be stopped. The approach enables the APT agent to accurately detect and block both known and zero-day exploits, without knowing anything about the threat or the exploited vulnerability. The "agent" may be any code-based module, program, process, component, thread or the like.

FIG. 4 depicts how APT attacks typically unfold and the points at which the APT solution is operative to stop the intrusion. For example, here the attacker 408 uses a spear-phishing email 410 to send an employee a weaponized document, one that contains hidden exploit code 412. When the user opens the document with a viewer, such as Adobe Acrobat or Word, the exploit code runs and attaches to an application vulnerability to silently download malware on the employee computer 402. The employee is never aware of this download. Another option is to send a user a link 414 to a malicious site. It can be a malicious website 416 that contains an exploit code or a legitimate website that was compromised (e.g., through a watering hole attack). When the employee clicks the link and the browser renders the HTML content, the exploit code runs and latches onto a browser (or browser plug-in) vulnerability to silently download malware on the employee computer. The link can also direct the user to a phishing site (like a fake web app login page) 418 to convince the user to submit corporate credentials. After infecting the computer 402 with advanced malware or compromising corporate credentials, attacker 408 has established a foothold within the corporate network and then can advance the attack.

As depicted, the agent 400 protects the enterprise against such threats at several junctions: (1) exploit prevention 420 that prevents exploiting attempts from compromising user computers; (2) exfiltration prevention 422 that prevents malware from communicating with the attacker and sending out information if the machine is already infected with malware; and (3) credentials protection 424 that prevent users from using corporate credentials on non-approved corporate sites (including phishing or and public sites like social networks or e-commerce, for example). In one known approach, the agent performs these and related operations by monitoring the application and its operations using a whitelist of legitimate application states.

By way of additional background, information-stealing malware can be directly installed on endpoints by the user without requiring an exploit. To exfiltrate data, typically the malware must communicate with the Internet directly or through a compromised application process. Advanced malware uses a few evasion techniques to bypass detection. For example, it compromises another legitimate application process and might communicate with the attacker over legitimate websites (like Forums and Google Docs). The agent 400 is also operative to stop the execution of untrusted code that exhibits data exfiltration states. To this end, preferably it validates that only trusted programs are allowed to use data exfiltration techniques to communicate with external networks. The agent preferably uses several techniques to identify unauthorized exfiltration states and malicious communication channels, and blocks them. Because it monitors the activity on the host itself, it has good visibility and can accurately detect and block these exfiltration states.

The reference herein to the identified commercial product is not intended to be limiting, as the approach herein may be implemented with any APT solution or functionality (even if embedded in other systems).

Cognitive Cybersecurity Analytics

Figure 5:
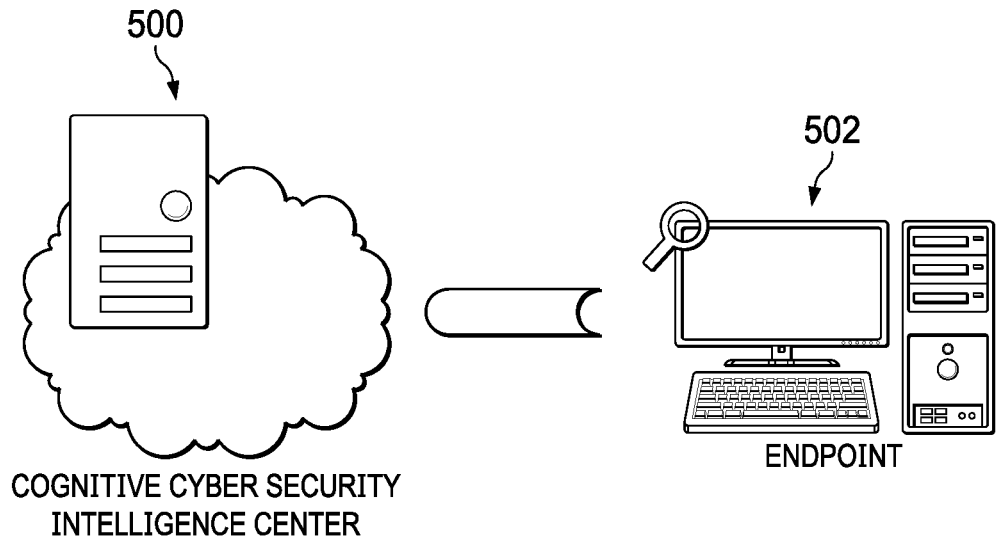
FIG. 5 illustrates an operating environment in which a cognitive cybersecurity intelligence center is used to manage an endpoint machine and in which the techniques of this disclosure may be implemented.

FIG. 5 depicts a basic operating environment that includes a cognitive cybersecurity intelligence center 500, and an endpoint 502. An endpoint 502 is a networked device that runs systems management code (software) that enables management and monitoring of the endpoint by the intelligence center 500.

The endpoint typically is a data processing system, such as described above in FIG. 2. The intelligence center 500 may be implemented as a security management platform such as depicted in FIG. 3, in association with an APT solution such as depicted in FIG. 4, or in other management solutions. Thus, for example, known commercial products and systems that provide endpoint management include IBM® BigFix®, which provides system administrators with remote control, patch management, software distribution, operating system deployment, network access protection and hardware and software inventory functionality. A commercial system of this type may be augmented to include the endpoint inter-process activity extraction and pattern matching techniques of this disclosure, or such techniques may be implemented in a product or system dedicated for this purpose.

In a typical implementation, an endpoint is a physical or virtual machine or device running an operating system such as Windows, Mac OSX, Vmware ESX, Linux, Unix, as various mobile operating systems such as Windows Phone, Symbian, iOS and Android. The cybersecurity intelligence center typically operates as a network-accessible security management platform comprising a plurality of machines and application software. Typically, the intelligence center supports cybersecurity analytics, e.g., using machine learning and the like. The intelligence center may operate in a dedicated manner to support a plurality of endpoints, or "as-a-service" on behalf of multiple enterprises each having their own endpoints. Typically, endpoint machines communicate with the intelligence center in a client-server paradigm, such as depicted in FIG. 1 and described above. The intelligence center may be located and accessed in a cloud-based operating environment.

In this approach, events, such as inter-process, events are sent from endpoints, such as endpoint 502, to a detection server executing in the intelligence center 500, where such events are analyzed. Preferably, attack detection occurs in the detection server. This approach provides for an efficient, systematic (as opposed to merely ad hoc) mechanism to record endpoint activities, e.g., via inter-process events, to describe a malicious or suspicious behavior of interest with abstractions (network graphs), and to match concrete activities (as represented in the recorded events) with abstract patterns. This matching enables the system to act upon malicious/suspicious behaviors (e.g., by halting involved processes, alerting, dropping on-going network sessions, halting on-going disk operations, and the like), as well as to assist security analysts to locate interesting activities (e.g., threat hunting) or to determine a next step that may be implemented in a workflow to address the suspect or malicious activity.

In this approach, typically both direct and indirect inter-process activities are extracted at endpoints and compared with pre-defined malicious behavior patterns for detection. Direct and indirect inter-process activities typically include control flow, such as process spawn, and information exchange via channels, such as files, sockets, messages, shared memory and the like. Inter-process activities reveal goals of processes and their particular execution paths. In the approach, they are matched against malicious inter-process behaviors for detecting attack instances. Preferably, the malicious behavior patterns are pre-defined with abstraction to characterize key steps in cyberattacks. These malicious behavior patterns typically are stored in an endpoint, and they can be updated as necessary.

Figure 6:
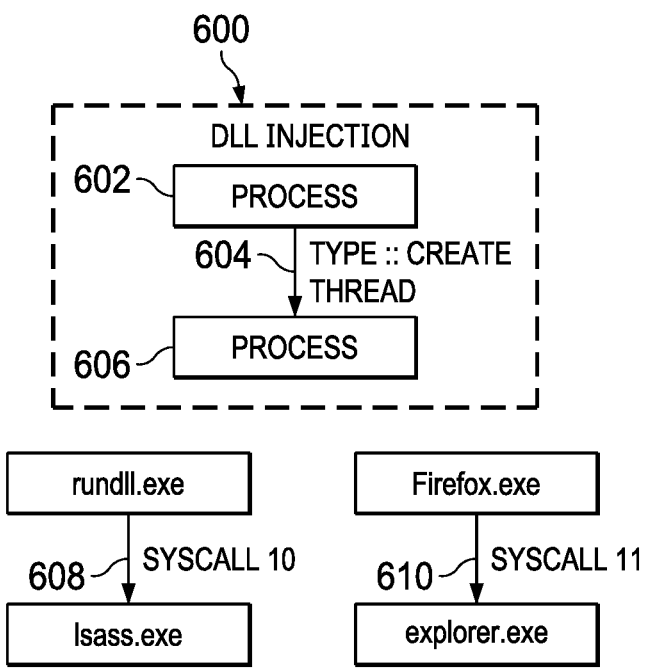
FIG. 6 depicts a representative malicious behavior graph abstraction, and several inter-process activity graphs that are matched to the graph abstraction.

FIG. 6 depicts how graphs are used to facilitate behavior-based detection/reasoning according to the above technique. In this approach, typically an individual (e.g., a software developer, a security analyst, or the like) describes a malicious or interesting behavior in an abstract graph pattern 600. In this injection, a DLL injection attack is modeled by a process 602 that executes an event (Type—create thread) 604, which then spawns another process 606. Generalizing, the graph pattern 600 comprises nodes (in this example processes 602 and 606), and edges (in this example, the event 604 that links the two nodes). In operation, a pattern matching algorithm may then return concrete activities on a host endpoint that match the pattern. The concrete activities on the endpoint preferably are also modeled by graphs to facilitate pattern matching. Two such example activity graphs 608 and 610 derived from the endpoint inter-process activity and that match the abstract graph behavior 600 are depicted. In the first example activity graph 608, process rundll.exe executing event Syscall 10 spawns process Isass.exe; in the second example activity graph 610, process Firefox.exe executing event Syscall 11 spawns process explorer.exe. This is an example of topology matching.

Figure 7:
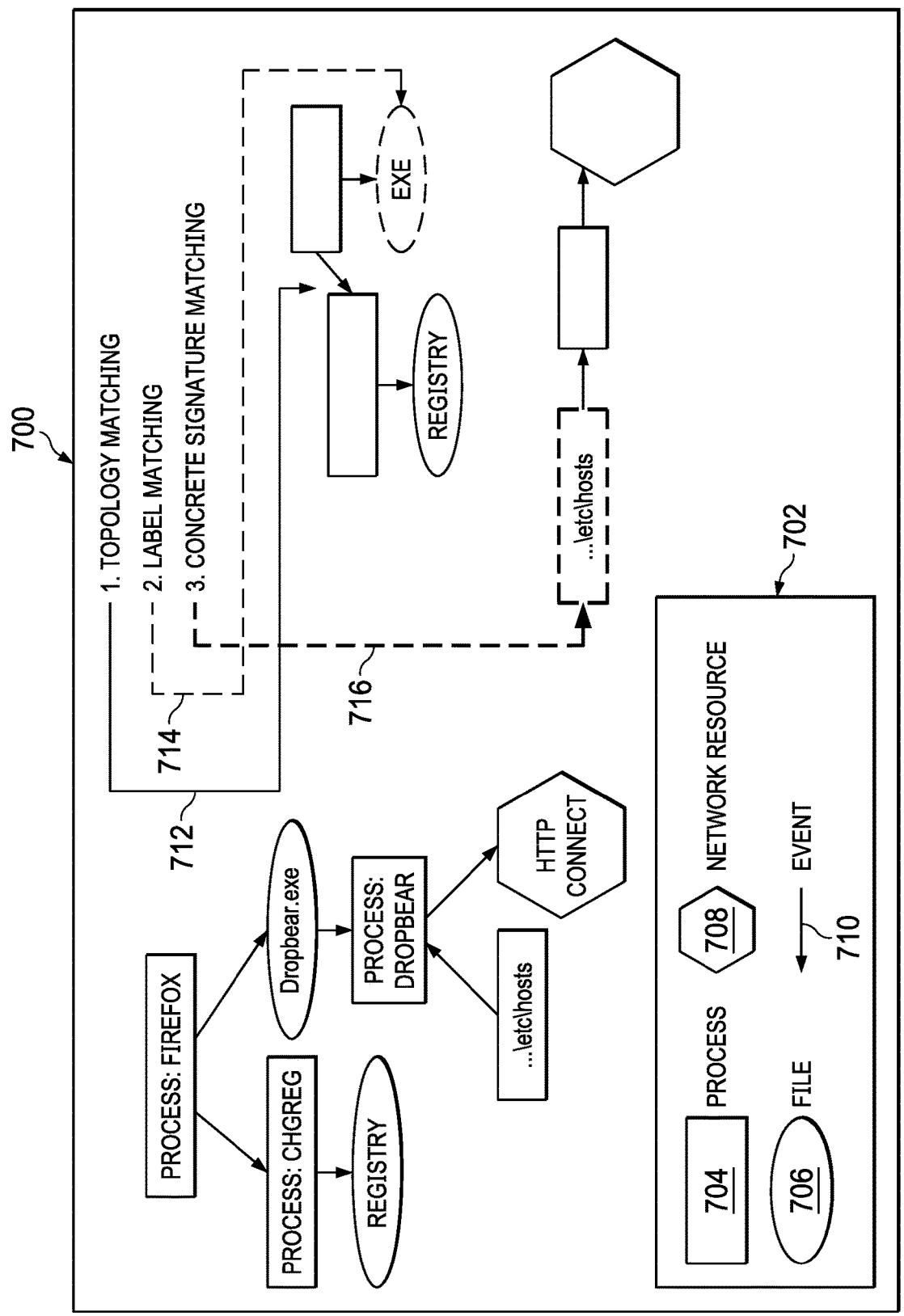
FIG. 7 depicts a representative inter-process graph constructed by monitoring activities among entities in an endpoint, and how various matching techniques are executed against that graph by an endpoint protection system according to the techniques herein.

FIG. 7 depicts a more complex example wherein as a result of inter-process activity monitoring, the graph 700 is generated. As depicted in the legend 702, typically a graph comprises a set of entities, namely a process 704, a file 706, a network resource 708, and an event 710. Preferably, each entity in the endpoint system is associated with a label (or "tag") that describes its category and properties, e.g., the installed Firefox (a process entity) is a "browser," the installed Firefox is "64-bit," and so forth. Labels may be assigned manually, e.g., "browser," generated automatically, e.g., if it is a 64-bit executable, or computed via a function, e.g., the label "trusted" is assign if the process meet certain requirements. Labels may replace entity names to create behavior patterns for a category of processes. The graph 700 is FIG. 7 depicts and comprises a set of entities, each of which typically has an associated label (tag) that is defined in an off-line manner. Inter-process activity is monitored on the endpoint, with activities among entities being recorded, e.g., via system call monitoring, kernel hooking, system monitoring services, and so forth. Typically, a relatively constrained set of system calls or events need to be monitored to obtain the information need to construct a graph. One example (given Linux as the operating system) would be system calls that associate one entity with another, e.g., sys_open and stub_execve. A graph typically is constructed (and updated as necessary) by connecting entities and monitored activities, with an example being graph 700. Preferably, the graph is stored on disk and cached in memory.

Generalizing, the activity graph represents real-time inter-process activity extraction that occurs at the endpoint. As also depicted in FIG. 7, this extraction then facilitates behavior matching (which typically occurs in the detection server executing in the intelligence center) using one or more matching techniques. These matching techniques typically include one or more topology matching 712, label matching 714, and optionally concrete signature matching 716 As noted above, inter-process activities (and their associated labeling) as depicted in the graph reveal goals of one or more processes, as well as their particular execution paths. Matching the generated graph(s) with malicious inter-process behaviors (also defined in the form of graphs) enables the system to detect and address attack instances. As noted, preferably the malicious behavior patterns are pre-defined with some degree of abstraction to characterize key steps in a cyberattack.

More formally, an abstract pattern graph (such as graph 600 in FIG. 6) against which monitored inter-process activity is compared is sometimes referred to as a pattern graph (PG). A PG may include one or more constraints, wherein a constraint typically is a Boolean function on elements or relations of elements of the graph. Typically, there are two types of constraints, namely, single element constraints (e.g., properties/classes/concepts of a vertex/edge in a pattern graph PG), and one or more element relation constraints (i.e. how one element relates to another, e.g., direct connection, latter than, connect with "n" steps, as so forth). The monitored activities of a host (endpoint) are instantiated in a graph that is sometimes referred to herein as an activity graph (AG). In FIG. 6, graphs 608 and 610 represent an AG. A goal of pattern matching then is to search for all subgraphs of AG that satisfy PG.

Figure 8:
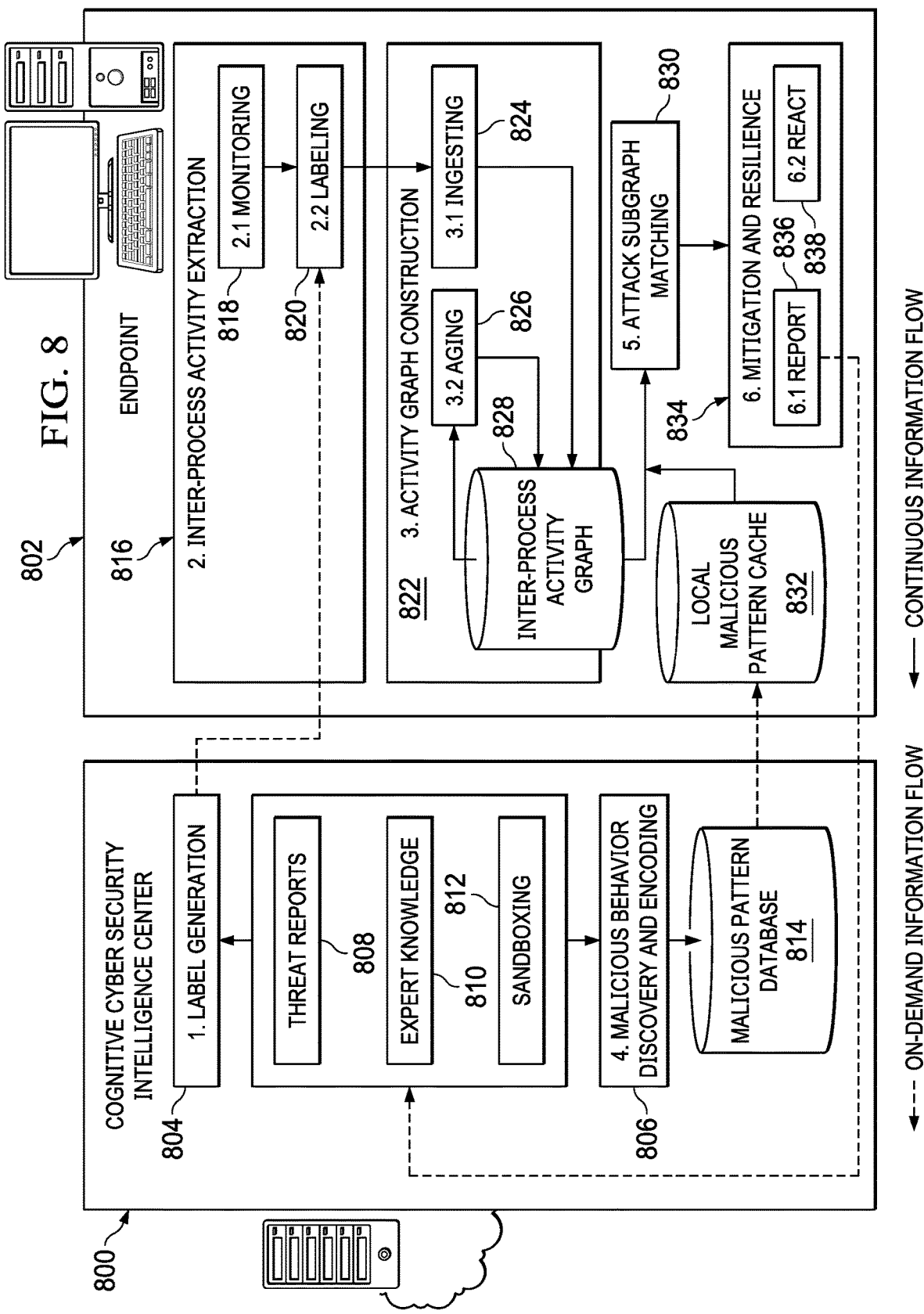
FIG. 8 depicts an implementation of an endpoint inter-process activity extraction and pattern matching system.

FIG. 8 depicts a representative embodiment of a detection system in which the endpoint inter-process activity extraction and pattern matching technique described above may be implemented. As depicted, certain functionality is located in the intelligence center 800 (e.g., the security management platform, an APT solution, an endpoint management solution, etc.), while certain functionality is located in the endpoint 802. This arrangement of functionality is preferred, but it is not intended to be limited. As noted above, the intelligence center 800 may be dedicated to the network of endpoints (e.g., located within an enterprise), or it may operate as a service provider (or, more generally, a "service") on behalf of multiple enterprises, each having their own set of endpoints. In a typical implementation, the cybersecurity intelligence center is network-accessible and is deployed in a cloud-based operating environment, although this is not a limitation. Further, typically each function block identified in FIG. 8 is executed in software, i.e., as a set of computer program instructions executed in a processor. The functions identified in FIG. 8 are provided for purposes of explanation only, and that certain of these functions may be combined or otherwise re-configured as necessary.

As depicted, the intelligence center 800 performs several functions, namely, label generation 804 (step 1), and malicious behavior discovery and encoding 806 (step (4)). As depicted, typically these activities are informed by and based on existing attack information available in the intelligence center, e.g., threat reports 808, expert knowledge 810 and information derived from sandboxing and evaluating threats 812. This set of information typically is available to or otherwise obtained by security analysts. As described above with respect to FIG. 7, in label generation 804, each entity in the endpoint system is associated with one or more labels that describe its category and properties. The labels are applied manually, automatically, programmatically, etc., or by some combination. The label generation 804 may be carried out periodically, or upon a given occurrence. The malicious behavior discovery and encoding 806 derives malicious (or otherwise suspect) graph patterns from existing attacks. As noted, typically these patterns are determined by human analysts, other security detection mechanisms, machine learning systems, or combinations thereof. As also depicted, a set of malicious patterns generated from the knowledgebase of attack source (808, 810, 812) is stored in a malicious pattern database 814.

Function block 816 (step 2) represents inter-process activity extraction, which typically involves monitoring 818 (step 2.1), and labeling 820 (step 2.2). The monitoring function records activities among entities, e.g. via system call monitoring, kernel hooking, system monitoring services and the like. Thus, the monitoring function 818 may leverage existing endpoint service functionality. As noted, it is not required that the monitoring 818 monitor all system calls or events, and the calls and events to be monitored is configurable as needed. Step 2.2, the labeling function, takes a behavior signature created by the labeling function (step 1) and builds an abstract/labelled behavior signature. This abstraction is desirable, as the abstract/labelled behavior signature expresses attack logic in a more general manner and thus covers one or more attack variants for a specific attack, and it enables the efficient matching of labels or concrete vertices/edges during subsequent matching operations (described below).

Function block 822 (step 3) provides activity graph construction. This processing typically involves ingesting 824 (step 3.1), which extends the graph as new activities occur and are monitored, and aging 826 (step 3.2), whereby vertices/edges of the graph are dropped (pruned) if they are older than a configurable threshold, or if their distance(s) to a newly-extended graph are larger than a configurable threshold. The inter-process activity graph generated by these activity graph construction function 822 is stored in a database 828. Typically, the inter-process activity graph evolves as the monitoring, ingesting and aging functions operate, preferably on a continuous basis.

As also depicted, the endpoint supports an attack subgraph matching function 830 (step 5). Using this function, the endpoint protection system continuously performs graph pattern matching between the evolving inter-process activity graph, and the malicious behavior graph patterns. These patterns are provided by the malicious pattern database 814 in the intelligence center 800 and stored in a local malicious pattern cache 832. As described above, the attack subgraph matching function searches for graph substructure that matches the malicious behavior graph pattern(s) stored in the local cache 832. Thus, in this approach, the endpoint detection system functionality compares the evolving activity graph with the malicious inter-process graph patterns. Based on this matching, a mitigation and resilience function 834 (step 6) may then be called. Function 834 comprises a report function 836 (step 6.1), and a react function 838 (step 6.2). The function 834 thus provides for post-detection operations, which typically comprises halting the involved processes, alerting, moving the involved processes to a sandbox for further evaluation, dropping on-going network sessions, halting on-going disk operations, handing off the matched subgraph to a user to decide a next step, submitting the matched subgraph to a security analyst for further study, training a machine learning classifier, and so forth. These are merely representative post-detection operations.

As also depicted in FIG. 8, the mitigation and resilience function 834 typically interacts with the intelligence center 800 in an on-demand manner, whereas information flow within the endpoint functions typically is continuous. One or more functions in the endpoint may be carried out on periodically, in response to an occurrence, or on-demand.

The above-described technique provides for a robust method to monitor and protect and endpoint by recording inter-process events, creating an inter-process activity graph based on the recorded inter-process events, matching the inter-process activity (as represented in the activity graph) against known malicious or suspicious behavior (as embodied in a set of pattern graphs), and performing a post-detection operation in response to a match between an inter-process activity and a known malicious or suspicious behavior pattern. Preferably, matching involves matching a subgraph in the activity graph with a known malicious or suspicious behavior pattern as represented in the pattern graph. During this processing, preferably both direct and indirect inter-process activities at the endpoint (or across a set of endpoints) are compared to the known behavior patterns.

A pattern graph (PG) (such as graph 600 in FIG. 6) may be specified visually (i.e., by drawing a graph), although this is not a requirement. A pattern graph (or graph pattern) also may be specified in other ways, e.g., by a program language.

The following provides additional details regarding the activity graph (AG) construct as described above. The activity graph typically expresses computations on one or more computing devices (which may include the endpoint) as a temporal graph. As such, the activity graph is also sometimes referred to herein as a computation graph (CG), as it represents an abstraction of the computations. The notion of an "activity graph" and a "connection graph" are used synonymously. As previously described, the basic elements of a AG/CG are entities (e.g., processes, files, network sockets, registry keys, GPS sensor, accelerometer, etc.), and events (e.g., file read, process fork, etc.). An entity is any system element that can either send or receive information. An event is any information/control flow that connects two or more entities. Events typically are information flows between pair of entities at specific times. Events can be captured in the form of system calls, etc. An event has a unique timestamp (when it happens), and an information flow direction (directional, bi-directional, non-directional). An indegree entity of an event can be one or two entities of the event based on its direction. An outdegree entity of an event can be one or two entities of the event based on its direction. A timestamp is an integer or real number that records the time of an event, and a joinpoint (or checkpoint) is a tuple of <entity, timestamp>. Thus, an AG/CG references a history of computation including any entities or events associated with attacks or threats. Security-related data, such as alerts, IOCs, and intermediate threat analysis results are subgraphs, which can be denoted as labels on elements of a AG/CG, where typically an element is an alias referencing an entity or an event. As a result, threat detection is a graph computation problem whose solution it to iteratively deduce threat-inducing subgraphs in a AG/CG.

More generally, an activity graph is a labeled semi-directed temporal graph that objectively records both intrusive and non-intrusive computations on computing devices, together with any security knowledge associated with the computations. A particular label on the graph typically denotes one of several categories, e.g. the labels: element attribute, element relation, and security knowledge. An element attribute label is objective information derived from computation recording (as has been described above); this type of label identifies a set of elements with a particular attribute, e.g., an event type READ. An element relation label is objective information derived from computation recording; this type of label expresses some relation among a set of elements, e.g., a provenance linkage between READ and WRITE events of a process, which connects a large number of READ/WRITE events. This label embeds finer-grained provenance information into an inter-process level PG. A security knowledge label (when used) is subjective information regarding the security and privacy goals and reasoning procedures; a label of this type marks a group of elements with some security knowledge. A security knowledge label can be generated as either intermediate/final results of threat deduction, or organization policies, IOCs, or anomaly scores imported from external detection systems, e.g., a set of confidential files, or IP addresses marked as command and control servers.

Enterprises and organizations typically inspect computations at multiple levels for threat discovery. An AG/CG typically describes computations at a selected monitoring level, such as network, host or process level. Given a monitoring level, e.g., network, the activities within an entity, e.g., process communications within a host, are usually out of the monitoring scope and not expressed in the CG. Finer-grained computation information typically is either expressed in a lower-level CG, e.g., a CG at the host level, or embedded into the CG as labels, e.g., provenance labels.

Figure 9:
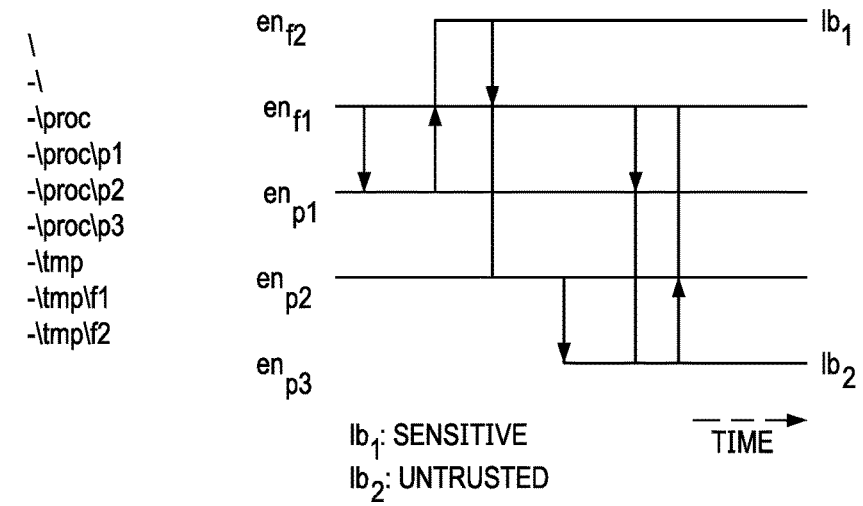
FIG. 9 depicts a representative activity graph for host level activities.
Figure 10:
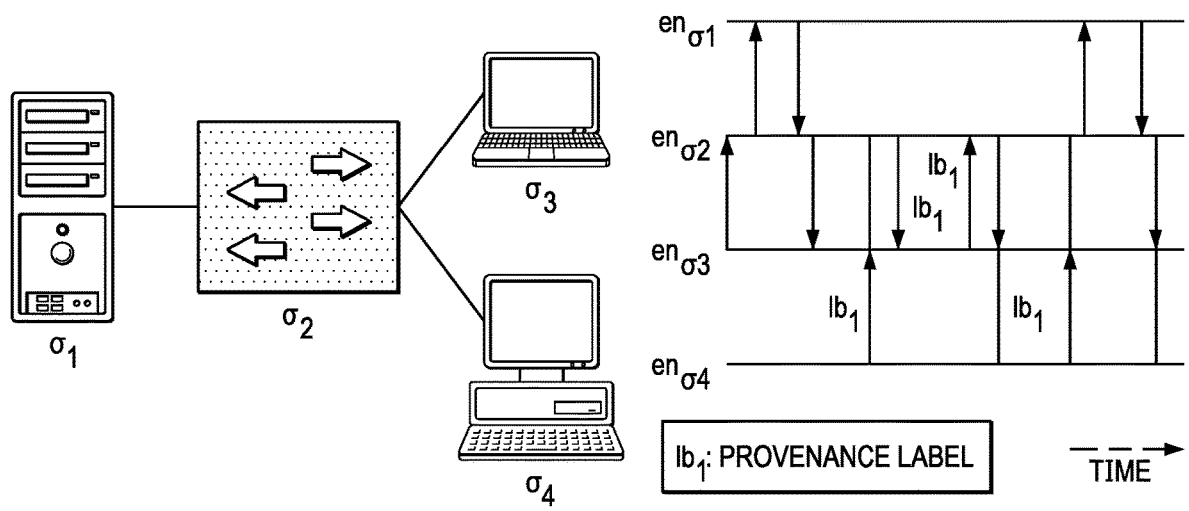
FIG. 10 depicts a representative activity graph for a set of network level activities.
Figure 11:
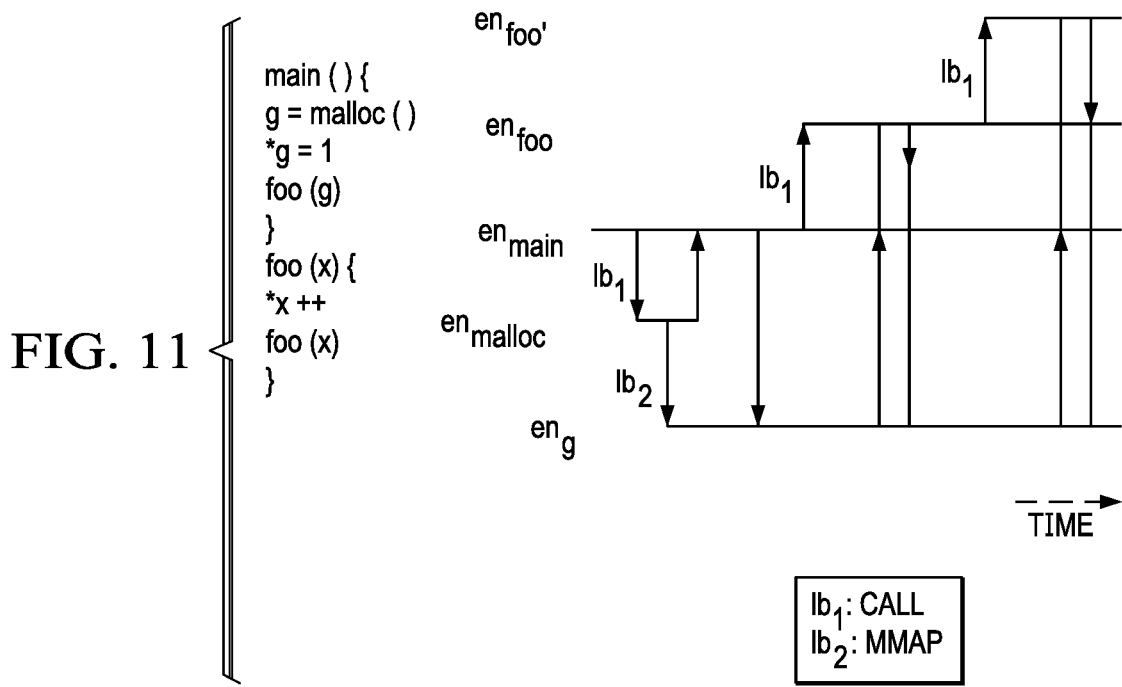
FIG. 11 depicts a representative activity graph for a set of process level activities.

FIG. 9 depicts a representative host-level AG/CG, e.g., processes and files. This graph provided a computation history as a temporal grid, wherein a horizontal line represents an entity, and wherein a vertical line represents an event. In FIG. 9, system activities are logged, e.g., via syscall monitoring and program instrumentation. Entities (en) in this CG consist of subjects (e.g., processes and threads) and objects (e.g., files, pipes, and network sockets). In this example, security data is embedded in labels: $lb_1$: sensitive indicates that $en_{f2}$ contains sensitive information, and $lb_2$: untrusted indicates that $en_{p3}$ is not certified by the company. In this example, data leakage occurs when $en_{p3}$ can be traversed from $en_{f2}$, as shown in FIG. 9. FIG. 10 depicts a representative AG/CG at a network level. In this example, the metadata of link layer communications of a small network is logged for threat intelligence computing. As depicted, $Ib_1$ is a provenance label linking four events among entities $en_{o2}$, $en_{o3}$ and $en_{o4}$. The link $Ib_1$ helps identify the causal chain between $en_{o3}$ and $en_{o4}$ avoiding impossible paths. Attack steps such as port scans and cross-host lateral movements can be identified and reasoned on this connection graph. FIG. 11 depicts an AG/CG at a process level, wherein activities with a process are monitored, e.g., via dynamic program analysis. In this graph, entities are memory addresses of code and data; events are instructions (e.g., call) or syscalls (nmap). The infinity of $\Theta$ (the space of entities that can be monitored or traced) supports the representation of recursive calls, e.g., instances of foo( ) are described as $en_{foo}$, $en'_{foo}$, .... Software exploit activities such as return-to-libc and return-oriented programming (ROP) can be captured and inspected on this connection graph. These are merely representative examples.

Given an activity/connection graph that records objective computation histories regarding both intrusive and non-intrusive data, threat discovery reduces to a graph query problem of iteratively computing the closure over the subset of security related subgraphs in the AG/CG, and finally yielding a subgraph that describes the threat or intrusion. Graph queries can be programmed into IDSes or behavior anomaly detection systems, or they can be accomplished through on-demand agile reasoning development. Threat hunting composes sequences of graph queries to iteratively and interactively conceive, verify, revise and confirm threat hypotheses.

The process of composing and executing graph queries in the activity/connection graph is graph computation. During the computation, any variable referencing a subgraph is also a label to the set of entities and events of that subgraph, and the variable can be stored as a label on the AG/CG. Because the outcome of each iterative graph computation step is a subgraph or a label, each step can be implemented natively in a graph computation language or in an external module as a black-box, which outputs a set of events and entities as the subgraph. Threat intelligence therefore is generated in the graph query when a threat is discovered. The query, especially the graph pattern, describes the threat and can be executed to search other activity/connection graphs for the specific threat.

Graph pattern matching is at the core of graph querying. Generalizing, a graph pattern, in essence, is a set of constraints describing the subgraph(s) to be matched, where a constraint over graph elements describes (1) a single graph element (e.g., a label/property of an entity), or (2) an element relation (e.g., an entity connects to an event). Pattern composition allows for embedding human domain knowledge into the deduction procedure. Simple pattern examples, which can be expressed by most graph languages, include: behavior of typical DLL injections (e.g., two entities with PROCESS labels are connected by an event with label CREATE_THREAD), behavior of untrusted executions (e.g., an entity with FILE label but not a TRUSTED_EXE label connects to an event labeled EXECUTE, then to an entity labeled PROCESS), and behavior of data leak (e.g., an entity labeled with SENSITIVE connects to an entity labeled NETFLOW within a given number of hops). These are representative but non-limiting examples.

Summarizing, in the approach described above threat discovery is transformed into a graph computation problem. In that approach, security logs, traces, and alerts are stored in a temporal graph or computation graph (CG). The CG records the history of monitored systems, including benign activities and malicious ones, as interconnected entities and events. Threat discovery then becomes a graph computation problem to identify a subgraph of CG that describes a threat or an attack, preferably with the help of alerts and security domain knowledge stored as element labels.

Automatic Understanding of User Behavior Using Intention Learning

With the above as background, the technique of this disclosure is now described. As described above, technique is machine learning-based method that aims to automatically identify an intention of behavior, typically when an alert is reported. The nature and operation of the alerting system is not necessarily a component of the disclosed approach, although the approach may be implemented natively in such a system.

The technique begins with a labeled semi-directed temporal (events) graph, which as described above typically is derived from system-generated events and that objectively records both intrusive and non-intrusive computations on computing devices. While a temporal graph of this type provides useful insights for threat discovery, it only describes raw process activities that are necessarily devoid of semantics (context). According to this disclosure, the temporal (events) graph is further mined in a unique manner to expose this semantic knowledge (intention). To this end, a set of one or more process-centric subgraphs are derived from the temporal graph, with each process-centric subgraph consisting of all events related to a given process represented by the subgraph. The subgraphs are then processed to identify one or more atomic operations that are shared by all of the processes, wherein an atomic operation comprises a set of system-generated events that provide an objective context of interest. An atomic operation typically is a small set of common actions used by more than one process. The atomic operation may describe a sequence of system-generated events, but this is not a requirement. An atomic operation is capable of being described as a graph, as it part of a larger semi-directed temporal graph that records all computation. An example atomic operation is a user visiting a website, which behavior comprises a set of common actions shared by different browsers (the different processes that use the same set of common actions), namely: (i) DNS lookup, (ii) TCP connection to the website's IP address, (iii) HTTP(S) session established to the site, (iv) main HTML fetch, (v) additional data fetch (for images, CSS, JS, etc.), (vii) additional data fetch from an associated website (at a different IP address), etc. As another example, an atomic operation for a simple file save operation (e.g., in Microsoft® Word) is composed of many events or system calls: (i) open file, (ii) file write (multiple events, but with the same type because each write syscall only writes a limited amount of data to disk), and (iii) close file. Of course, these are merely representative examples of atomic operations.

After mining for the atomic operations, the temporal graph is then reconstructed, preferably by substituting the identified atomic operations derived from the process-centric subgraphs for the edges in the original temporal graph, thereby generating a reconstructed temporal (events) graph. Using graph embedding, the reconstructed graph data is then converted into a vector-based representation suitable for further machine learning. Graph embedding functions (that convert a graph into a vector representation) are known. Machine learning may be implemented using a deep neural network (DNN). By training the DNN, the system then learns the intention underlying the temporal (events) graph, thereby modeling the intentions of the computer system processes themselves. The approach operates to understand the running behavior of programs (and, in particular, the underlying processes), and classifies them, thereby enabling detection of potential malicious behaviors.

Thus, and as will be described, the approach herein extracts from the temporal graph a set of objective atomic operations (sets of system-generated events), embeds those operations into the temporal graph, and then uses a representation of the resulting reconstructed temporal graph to train a machine learning model to label the intention of the temporal graph.

Figure 12:
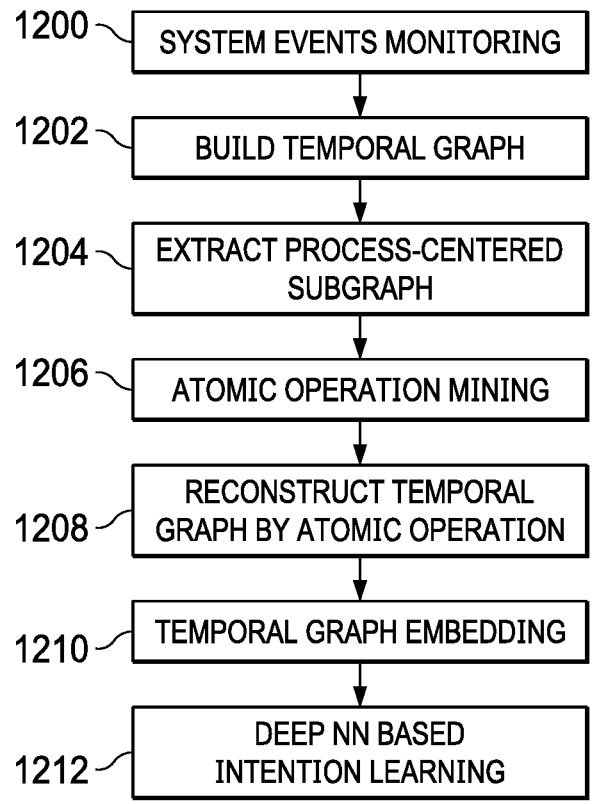
FIG. 12 depicts an automated method according to this disclosure that is operative in response to reporting of an alert to identify an intention of related behavior.

FIG. 12 depicts the basic operation of the above-described technique in a preferred embodiment. In one embodiment, the technique is implemented in an intelligence center such as depicted in FIG. 8, typically as software executed in suitable physical or virtual machines. As noted above, the technique may be associated with some other security system or device, e.g., an alerting system, but this is not a requirement. In addition, the technique may be implemented in a computer system that serves as a front-end to another security device or system.

At step 1200, the system receives as input one or more system-generated events records, e.g., from system logs. At step 1202, and based on a timestamp, process identifier (id), object (file, socket, source, sink) id, and the system call between process (thread) and objects, a semi-directional temporal (events) graph is built. This graph thus can represent any concurrent systems, devices, programs, processes, or the like within or associated with a computer system or network of interest. The temporal graph typically comprises a node set, a set of directed edges ordered by their timestamps, a set of labels assigned to the nodes, and a set of timestamps, which are integer values on the edges. At step 1204, a process-centric subgraph is then built for each given process represented in the temporal graph. A process-centric subgraph typically comprises the events related to the given process. It is not required that all events related to the given process be used. This step is carried out to find common patterns and to extract atomic operations. At step 1206, and from each process-centric subgraph, one or more sets of events (between and/or among any given process and object) are extracted. As noted above in the several examples, typically an atomic operation is some small set of common actions used by more than one process. Based on those sequences, one or more statistical methods are then applied to find a set of atomic operations, which are shared by all (or a given subset of the) processes, and that are representative of sequences. Representative statistical methods include, without limitation, frequency analysis, and co-occurrence analysis. At step 1208, the system reconstructs the semi-directional temporal graph built in step 1202, preferably with nodes unchanged, but with the edges or other entities from that graph replaced by atomic operations. This operation is sometimes referred to herein as "modifying" the original temporal graph. At step 1210, a graph embedding operation is then carried out to project the modified temporal graph (as derived in step 1210) into one or more vectors, sometimes referred to herein as a vector representation. At step 1212, machine learning is then applied to the vector representation. In a representative embodiment, a deep neural network (DNN) is applied to learn intentions from labeled data, taking the vectors generated as step 1210 as input.

As described, the technique depicted in FIG. 12 and described above extracts objective atomic operations, where an atomic operation typically is comprised of a set of system events that are common to a process. These objective atomic operations provide basic semantics, and statistical learning is then carried out on the training data set, which typically is quite large, as it includes system events associated with programs and processes that quite often are frequently used in the enterprise. The temporal graph embedding and intention learning is facilitated by reconstructing the temporal graph with atomic operations (step 1208), and by utilizing graph-embedding to project the modified temporal graph into the vector representation (step 1210).

The approach described above enables hierarchical building of the common patterns that represent behaviors. In particular, and during the processing described in FIG. 12, multiple atomic operations can merge into a common pattern, which pattern may then appear again and again in the underlying temporal graph. Graph embedding typically is then performed on the common patterns, thereby embedding low/high level behaviors (atomic operations or larger common patterns) into vectors. The vectors are then provided to the supervised machine learning, e.g., for intrusion detection (or other security-related) purposes. The technique described above provides several advantages. By upgrading the temporal graph in this manner, the system can train the machine learning model to more efficiently and more precisely identify the intention of related user behavior when an alert is reported. The approach is highly-scalable, as the output from the machine learning is readily consumable by human security analysts (or other automation) to more readily manage the large number of security alerts. The approach is flexible and generic. In lieu of simply extracting patterns of known malware, the technique provides a generic and objective summary of user behavior as reflected in the mined atomic operations.

There is no requirement as to the type of user behavior that can be detected and characterized using the described technique. The nature of the user behavior of course will depend on the computer system at issue, what applications are supported, what activities are permitted, and so forth, and as such the user behavior(s) at issue will be implementation-specific. As non-limiting examples of user intention (that are associated with common patterns in later-supervised machine learning), these may include: copying a shadow file to a www directory for data exfiltration (malicious intent), copying a shadow file to an external data storage for offline brute force password cracking (malicious intent), and so forth. Moreover, and depending on the machine learning implemented, the system may tag given behaviors with more than just one tag (benign or malicious); thus, e.g. a certain user behavior involving a DNS query followed by an HTTP GET may be characterized additional as just a "website visit."

The technique may be implemented in a behavior-based malware detection system that operates in association with a monitored computing system or network. The computing system being monitored may be implemented as described above with respect to FIG. 2, and it is assumed to comprise executing a set of (runtime) processes. System events, e.g., system calls and API calls of each process, are continuously monitored and recorded. The particular manner in which the system events are monitored, identified and stored is not an aspect of this disclosure. In a typical implementation, system activities of this type are logged, e.g., by the operating system, or by via syscall monitoring and program instrumentation. The malware detection system is configured to execute in any of the operating system environments described above, e.g., FIG. 3, FIG. 4 or FIG. 5. One of more components of the malware detection system may execute in a cloud-based architecture. In a variant implementation, the malware detection system executes natively in the computing system whose system events are being monitored.

Typically, each such module is implemented in software, namely, as a set of computer program instructions, executed in one or more hardware processors. These modules may be integrated with one another, co-located or distributed, or otherwise implemented in one or more computing entities. One or more of these functions may be implemented in the cloud.

The technique herein may be used to facilitate malware detection for computing systems other than the computing system(s) whose system events were recorded and used to facilitate the model building.

The approach herein is designed to be implemented in an automated manner within or in association with a security system, such as a SEIM device or system in FIG. 3, an APT platform as depicted in FIG. 4, a cloud-based cybersecurity analytics system in FIG. 5, or some other execution environment wherein system events are captured and available for mining and examination. The particular operating platform or computing environment in which the event modeler technique is implemented, however, is not a limitation. The machine learning itself can be provided "as-a-service" using a machine learning platform or service.

Alternatively, the functionality described above may be implemented as a standalone approach, e.g., a software-based function executed by a processor, or it may be available as a managed service (including as a web service via a SOAP/XML interface). The particular hardware and software implementation details described herein are merely for illustrative purposes are not meant to limit the scope of the described subject matter.

The particular nature and type of machine learning herein may vary. Any deep learning may be used. Deep learning is a type of machine learning framework that automatically learns hierarchical data representation from training data without the need to handcraft feature representation. A DNN as used herein may be composed of basic neural network units, such as linear perceptrons, convolutions and non-linear activation functions. These network units are organized as layers (from a few to more than a thousand), and they are trained directly from the raw data (in this case the vector representation) to recognize complicated concepts. Lower network layers often correspond with low-level features (e.g., in image recognition, such as corners and edges of images), while the higher layers typically correspond with high-level, semantically-meaningful features.

Specifically, a deep neural network (DNN) as used herein takes as input the raw training data representation and maps it to an output via a parametric function. The parametric function is defined by both the network architecture and the collective parameters of all the neural network units used in the network architecture. Each network unit receives an input vector from its connected neurons and outputs a value that will be passed to the following layers. For example, a linear unit outputs the dot product between its weight parameters and the output values of its connected neurons from the previous layers. To increase the capacity of DNNs in modeling the complex structure in training data, different types of network units have been developed and used in combination of linear activations, such as non-linear activation units (hyperbolic tangent, sigmoid, Rectified Linear Unit, etc.), max pooling and batch normalization. If the purpose of the neural network is to classify data into a finite set of classes, the activation function in the output layer typically is a softmax function, which can be viewed as the predicted class distribution of a set of classes.

Prior to training the network weights for a DNN, an initial step is to determine the architecture for the model, and this often requires non-trivial domain expertise and engineering efforts. Given the network architecture, the network behavior is determined by values of the network parameters, $\theta$. More formally, let $D=\{x_i, z_i\}^T_{i=1}$ be the training data, where $z_i \in [0, n-1]$ is a ground truth label for $x_i$, the network parameters are optimized to minimize a difference between the predicted class labels and the ground truth labels based on a loss function. Currently, the most widely-used approach for training DNNs is a back-propagation algorithm, where the network parameters are updated by propagating a gradient of prediction loss from the output layer through the entire network. Most commonly-used DNNs are feed-forward neural networks, wherein connections between the neurons do not form loops; other types of DNNs include recurrent neural networks, such as long short-term memory (LSTM), and these types of networks are effective in modeling sequential data.

Formally, a DNN has been described in literature (Xu et al) by a function g: $X \rightarrow Y$, where X is an input space, and Y is an output space representing a categorical set. For a sample x that is an element of X, $g(x)=f_L(F_{L-1}(\ldots((f_1(x))))$. Each $f_i$ represents a layer, and $F_L$ is the last output layer. The last output layer creates a mapping from a hidden space to the output space (class labels) through a softmax function that outputs a vector of real numbers in the range [0, 1] that add up to 1. The output of the softmax function is a probability distribution of input x over C different possible output classes.

The graph-based techniques described herein are not limited for use with a deep neural network (DNN) model. The approach may be extended to and used as a front-end to any machine learning model including, without limitation, a Support Vector Machine (SVM), a logistical regression (LR) model, and the like, that has internal processing states, and the approach may also be extended to use with decision tree-based models.

More generally, computing devices within the context of the disclosed subject matter are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

The scheme described herein may be implemented in or in conjunction with various server-side architectures including simple n-tier architectures, web portals, federated systems, and the like. The techniques herein may be practiced in a loosely-coupled server (including a "cloud"-based) environment.

Still more generally, the subject matter described herein can take the form of an entirely hardware embodiment, an entirely software embodiment or an embodiment containing both hardware and software elements. In a preferred embodiment, the function is implemented in software, which includes but is not limited to firmware, resident software, microcode, and the like. Furthermore, as noted above, the identity context-based access control functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the machine learning-based techniques are implemented in a special purpose computer, preferably in software executed by one or more processors. The software is maintained in one or more data stores or memories associated with the one or more processors, and the software may be implemented as one or more computer programs. Collectively, this special-purpose hardware and software comprises the functionality described above.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

The techniques herein provide for improvements to another technology or technical field, among others: threat intelligence systems, malware detectors, endpoint management systems, APT solutions, security incident and event management (SIEM) systems, as well as cybersecurity analytics solutions.

The techniques herein may be used to discover and act upon activity in other than an enterprise endpoint machine.

Having described the subject matter above, what we claim is as follows.

The invention claimed is:

1. A method to detect anomalous behavior in a computing system, comprising:

receiving a semi-directed temporal graph derived from system-generated events;

deriving from the semi-directed temporal graph one or more process-centric subgraphs, wherein a process-centric subgraph comprises one or more system-generated events associated with a given process;

identifying from the one or more process-centric subgraphs one or more atomic operations, wherein an atomic operation comprises a set of system-generated events common to more than one process-centric subgraph;

modifying the semi-directed temporal graph by replacing edges in the semi-directed temporal graph with the one or more identified atomic operations while leaving nodes in the semi-directed temporal graph unchanged; and training a machine learning model using the modified semi-directed temporal graph.

2. The method as described in claim 1 wherein training the machine learning model includes:

applying graph embedding to the modified semi-directed temporal graph to generate one or more vectors; and applying to the machine learning model the one or more vectors as labeled data sets.

3. The method as described in claim 2 wherein the machine learning model is a deep neural network (DNN) that is trained to distinguish between benign and malicious user actions.

4. The method as described in claim 1 wherein the one or more atomic operations are identified by applying a statistical algorithm to sequences of events derived from the one or more process-centric subgraphs.

5. The method as described in claim 1 further including:

receiving a set of system-generated events, wherein at least one system-generated event is responsive to a user action, and wherein each of the system-generated events has an associated set of parameters; and using the associated parameters for one or more system-generated events to build the semi-directed temporal graph.

6. The method as described in claim 1 further including setting a filter on an output of the machine learning model to attempt to identify a particular user intent or other given behavior information.

7. The method as described in claim 1 further including using the trained machine learning model to detect a potentially malicious behavior associated with the computer system.

8. An apparatus, comprising:

a processor;

computer memory holding computer program instructions executed by the processor, the computer program instructions configured to detect anomalous behavior in a computer system, the computer program instructions comprising program code configured to:

receive a semi-directed temporal graph derived from system-generated events;

derive from the semi-directed temporal graph one or more process-centric subgraphs, wherein a process-centric subgraph comprises one or more system-generated events associated with a given process;

identify from the one or more process-centric subgraphs one or more atomic operations, wherein an atomic operation comprises a set of system-generated events common to more than one process-centric subgraph;

modify the semi-directed temporal graph by replacing edges in the semi-directed temporal graph with the one or more identified atomic operations while leaving nodes in the semi-directed temporal graph unchanged; and train a machine learning model using the modified semi-directed temporal graph.

9. The apparatus as described in claim 8 wherein the program code configured to train the machine learning model includes program code further configured to:

apply graph embedding to the modified semi-directed temporal graph to generate one or more vectors; and apply to the machine learning model the one or more vectors as labeled data sets.

10. The apparatus as described in claim 9 wherein the machine learning model is a deep neural network (DNN) that is trained to distinguish between benign and malicious user actions.

11. The apparatus as described in claim 8 wherein the program code configured to identify the one or more atomic operations includes program code further configured to apply a statistical algorithm to sequences of events derived from the one or more process-centric subgraphs.

12. The apparatus as described in claim 8 wherein the computer program instructions are further configured to:

receive a set of system-generated events, wherein at least one system-generated event is responsive to a user action, and wherein each of the system-generated events has an associated set of parameters; and use the associated parameters for one or more system-generated events to build the semi-directed temporal graph.

13. The apparatus as described in claim 8 wherein the computer program instructions include program code further configured to set a filter on an output of the machine learning model to attempt to identify a particular user intent or other given behavior information.

14. The apparatus as described in claim 8 wherein the computer program instructions include program code further configured to use the trained machine learning model to detect a potentially malicious behavior associated with the computer system.

15. A computer program product in a non-transitory computer readable medium for use in a data processing system, the computer program product holding computer program instructions that, when executed by the data processing system, are configured to detect anomalous behavior in a computer system, the computer program instructions comprising program code configured to:

receive a semi-directed temporal graph derived from system-generated events;

derive from the semi-directed temporal graph one or more process-centric subgraphs, wherein a process-centric subgraph comprises one or more system-generated events associated with a given process;

identify from the one or more process-centric subgraphs one or more atomic operations, wherein an atomic operation comprises a set of system-generated events common to more than one process-centric subgraph;

modify the semi-directed temporal graph by replacing edges in the semi-directed temporal graph with the one or more identified atomic operations while leaving nodes in the semi-directed temporal graph unchanged; and train a machine learning model using the modified semi-directed temporal graph.

16. The computer program product as described in claim 15 wherein the program code configured to train the machine learning model includes program code further configured to:

apply graph embedding to the modified semi-directed temporal graph to generate one or more vectors; and apply to the machine learning model the one or more vectors as labeled data sets.

17. The computer program product as described in claim 16 wherein the machine learning model is a deep neural network (DNN) that is trained to distinguish between benign and malicious user actions.

18. The computer program product as described in claim 15 wherein the program code configured to identify the one or more atomic operations includes program code further configured to apply a statistical algorithm to sequences of events derived from the one or more process-centric subgraphs.

19. The computer program product as described in claim 15 wherein the computer program instructions are further configured to:

receive a set of system-generated events, wherein at least one system-generated event is responsive to a user action, and wherein each of the system-generated events has an associated set of parameters; and use the associated parameters for one or more system-generated events to build the semi-directed temporal graph.

20. The computer program product as described in claim 15 wherein the computer program instructions include program code further configured to set a filter on an output of the machine learning model to attempt to identify a particular user intent or other given behavior information.

21. The computer program product as described in claim 15 wherein the computer program instructions include program code further configured to use the trained machine learning model to detect a potentially malicious behavior associated with the computer system.

* * * * *